United States Patent
Mendiola et al.

(10) Patent No.: US 7,218,921 B2
(45) Date of Patent: May 15, 2007

(54) METHOD AND SYSTEM FOR INVITING AND CREATING ACCOUNTS FOR PROSPECTIVE USERS OF AN INSTANT MESSAGING SYSTEM

(75) Inventors: Dennis Mendiola, New York, NY (US); Brian Schlotman, Cincinnati, OH (US)

(73) Assignee: Chikka Pte Ltd, Singapore (SG)

( * ) Notice: Subject to any disclaimer, the term of this patent is extended or adjusted under 35 U.S.C. 154(b) by 509 days.

(21) Appl. No.: 09/846,377

(22) Filed: May 2, 2001

(65) Prior Publication Data

US 2002/0006803 A1    Jan. 17, 2002

Related U.S. Application Data

(60) Provisional application No. 60/203,928, filed on May 12, 2000.

(30) Foreign Application Priority Data

May 12, 2000 (WO) .................. PCT/SG00/00070

(51) Int. Cl.
*H04Q 7/22* (2006.01)
(52) U.S. Cl. ............... 455/414.1; 455/435.1; 455/466; 715/757
(58) Field of Classification Search ......... 455/411, 455/412.1, 412.2, 433, 466, 414.1, 416, 426.1, 455/435.1; 707/1, 10; 370/337, 347; 715/753, 715/757

See application file for complete search history.

(56) References Cited

U.S. PATENT DOCUMENTS 5,577,103 A * 11/1996 Foti ................. 455/412.1

(Continued)

FOREIGN PATENT DOCUMENTS

EP    0 898 431 A1    2/1999

(Continued)

OTHER PUBLICATIONS

International Search Report—International Application No. PCT/SG 00/00068.

(Continued)

*Primary Examiner*—William Trost
*Assistant Examiner*—James D Ewart
(74) *Attorney, Agent, or Firm*—Intellectual Property Law Group LLP; Otto O. Lee; Juneko Jackson

(57) ABSTRACT

A system and method for assigning a unique identifier to a prospective user of an instant messaging system. The IM system comprises a plurality of clients (111) having IM applications of the same or different types, selectively interconnected to an IM server (113) by way of the internet (117). The system includes a registration handler (119) for receiving a client specific access address (johnsmith@company.com) of a prospective user (127) on the internet (117) together with a request (115) to register or tentatively register the prospective user (127). A unique identifier assigner is provided to automatically allocate a unique numeric identifier (UIN) to the prospective user (127) and match the UIN to the client specific address (johnsmith@company.com) of the prospective user. An account processer registers or tentatively registers an account for the prospective user (127) in a user database (123) for future use (125) by storing (121) the matched UIN and client specific access address under the UIN in the database. A message despatcher sends a notification (129) of the UIN to the prospective user (127) at the client specific address of the prospective user, either: confirming the registering of the prospective user if the initial sending was associated with a direct request to register from the prospective user; or inviting registration of the prospective user if the initial sending was associated with a request to register from someone other than the prospective user.

20 Claims, 4 Drawing Sheets

U.S. PATENT DOCUMENTS

| | | | | |
|---|---|---|---|---|
| 5,757,908 | A * | 5/1998 | Cooper et al. | 713/165 |
| 5,848,396 | A * | 12/1998 | Gerace | 705/10 |
| 6,108,325 | A * | 8/2000 | Stephanson et al. | 370/337 |
| 6,157,829 | A * | 12/2000 | Grube et al. | 455/414.1 |
| 6,208,870 | B1 * | 3/2001 | Lorello et al. | 455/466 |
| 6,243,692 | B1 * | 6/2001 | Floyd et al. | 705/59 |
| 6,301,609 | B1 * | 10/2001 | Aravamudan et al. | 709/207 |
| 6,309,305 | B1 * | 10/2001 | Kraft | 455/566 |
| 6,333,973 | B1 * | 12/2001 | Smith et al. | 379/88.12 |
| 6,405,123 | B1 * | 6/2002 | Rennard et al. | 701/200 |
| 6,424,841 | B1 * | 7/2002 | Gustafsson | 455/466 |
| 6,578,008 | B1 * | 6/2003 | Chacker | 705/10 |
| 6,625,460 | B1 * | 9/2003 | Patil | 455/414 |
| 6,668,055 | B2 * | 12/2003 | Marwell et al. | 379/265.13 |
| 6,697,484 | B1 * | 2/2004 | Fleming, III | 379/354 |
| 6,757,898 | B1 * | 6/2004 | Ilsen et al. | 709/203 |
| 6,826,700 | B1 * | 11/2004 | Germscheid et al. | 713/202 |
| 6,831,918 | B1 * | 12/2004 | Kavak | 370/395.52 |
| 7,117,254 | B2 * | 10/2006 | Lunt et al. | 709/218 |
| 2001/0003202 | A1 | 6/2001 | Mache et al. | |
| 2001/0003203 | A1 | 6/2001 | Mache | |
| 2001/0021245 | A1 * | 9/2001 | Katz | 379/92.01 |
| 2001/0034224 | A1 * | 10/2001 | McDowell et al. | 455/412 |
| 2001/0042037 | A1 * | 11/2001 | Kam et al. | 705/36 |
| 2002/0007398 | A1 * | 1/2002 | Mendiola et al. | 709/206 |
| 2002/0013711 | A1 * | 1/2002 | Ahuja et al. | 705/1 |
| 2002/0026520 | A1 | 2/2002 | Mendiola et al. | |
| 2002/0029173 | A1 * | 3/2002 | Goldstein | 705/26 |
| 2002/0037708 | A1 * | 3/2002 | McCann et al. | 455/411 |
| 2002/0065894 | A1 * | 5/2002 | Dalal et al. | 709/206 |
| 2002/0083035 | A1 * | 6/2002 | Pearl et al. | 707/1 |
| 2002/0087476 | A1 * | 7/2002 | Salas et al. | 705/59 |
| 2002/0143916 | A1 | 10/2002 | Mendiola et al. | |
| 2003/0211845 | A1 * | 11/2003 | Lohtia et al. | 455/414.3 |

FOREIGN PATENT DOCUMENTS

| | | | |
|---|---|---|---|
| WO | WO 98/28920 | * | 12/1996 |
| WO | WO 97/41654 | * | 11/1997 |
| WO | WO97/47121 | * | 12/1997 |
| WO | WO 97/23988 | * | 7/1998 |
| WO | WO 99/33293 | * | 7/1999 |
| WO | WO 99 48011 | | 9/1999 |
| WO | WO 00 16209 | | 3/2000 |

OTHER PUBLICATIONS

International Search Report—International Application No. PCT/SG 00/00069.

International Search Report—International Application No. PCT/SG 00/00070.

* cited by examiner

METHOD AND SYSTEM FOR INVITING AND CREATING ACCOUNTS FOR PROSPECTIVE USERS OF AN INSTANT MESSAGING SYSTEM

CROSS-REFERENCE TO RELATED APPLICATIONS

This application claims the priority of International Application No. PCT/SG00/00070, filed May 12, 2000 and the benefit of U.S. provisional application No. 60/203,928, filed May 12, 2000.

FIELD OF THE INVENTION

The present invention relates to a computer network based instant messaging system and more particularly to a method and system for assigning unique identifiers to prospective users and creating accounts for them to use the system.

This invention has particular utility for inviting and registering prospective users using email-based client applications and Global System for Mobile Communications ("GSM") network devices, such as mobile phones, as client applications for accessing and using an instant messaging system.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

Instant messaging ("IM") systems have become very popular in recent times with the increasing use of the internet and email by all sectors of the community as a communication medium. With internet use pervading the areas of the domestic market and being taken up by younger, computer-literate generations as a social medium in its own right, a need has arisen for spontaneous and "instantaneous" messages to be exchanged between two or more parties connected to the internet simultaneously. This need has not been able to able to be satisfied by the use of traditional email systems and consequently, IM systems have spawned as an alternative or adjunct to email.

"Instantaneous" in the context of IM means the ability to receive messages without prompting a message-handling server. This is in contrast to the way typical emails are sent and received by internet users.

To send and receive messages, popular personal computer-based email applications, such as Eudora™ or Microsoft Outlook™, employ the Simple Mail Transfer Protocol ("SMTP") and the Post Office Protocol ("POP"). Using POP requires the recipient of an email to query or prompt an email server to which it has subscribed, for messages to download to the user's personal computer ("PC") or any other internet-connected device.

Email messages are sent by a user from an email PC client application (e.g., Eudora™, Microsoft Outlook™) on that user's PC to a mail server to which it has subscribed using SMTP. The mail or SMTP server then forwards the message to the desired recipient's mail server via the internet.

Instant messaging systems work in a different fashion to email, requiring minimal if any user action, to receive messages. Messages are forwarded from a sender's client application, normally a PC-based IM client application program, to the intended recipients client application via an IM server or directly to the recipient's client, almost in "real time" from the time that a message is sent by the sender, or received by the IM server system—hence "instant". No querying is needed to get a message to its intended recipient, reflecting more of a "pushing" technology, than a "pulling" of information. Examples of some popular IM systems in the market include AOL's AIM™ and ICQ™.

A characteristic of most IM systems is that a client user is able to set up a network of friends or colleagues, more commonly known as "buddies", with or amongst whom messages can be exchanged instantly. In most of the PC-based client applications, an IM sender must be authorized by the recipient (both are considered "buddies" of one another) to be able to receive messages from the sender. In such cases, an authorization is made by a user specifically instructing the IM server to allow messages to be received from particular senders.

In some IM systems, authorizations are not required for users to be included in a buddy list. This means that instant messages may be freely sent amongst existing users and a target user can be added to a particular buddy list of a user without that user requiring the explicit permission of the target user to be so included.

Authorizations may also be required by users to allow them to be detected by other users as being "online". "Online" in the context of IM means that a client user is connected to the internet or is otherwise capable of receiving instant messages at a particular moment.

A limitation with current IM systems is that some are not designed to interconnect with particular types of client applications or different IM systems, or at least make it difficult to do so. For example, other client applications may include email-based client applications (eg Eudora™, Microsoft Outlook™) and browser-based client applications (eg Internet Explorer™ and Netscape™) on the internet, and also devices connected into a GSM network, such as mobile phones.

GSM networks have their own form of IM system for communicating short textual messages between different subscribers known as "Short Message Service" ("SMS"). With SMS, a "Short Message Service Centre" "(SMSC") provides a server through which all SMS messages that are sent and received by client subscribers are handled. The messages are short, typically limited to 160 characters in length, and are sent between subscribers of the GSM network, with the SMSC processing the messages for delivery to the right destination using the GSM mobile number of the intended receiver. Under the SMS protocol, the textual message from the sender is initially sent to the SMSC server using the cellular telephone network. The SMSC then stores the message and allocates it to the intended recipient for downloading, in accordance with normal GSM protocol, when the recipient is identified to be active within a cell.

SMS messaging is normally only provided between GSM clients that specifically subscribe to it, however, by virtue of the SMSC server, it is possible to connect to the internet using a particular protocol, dependent upon the particular GSM phone and network manufacturer. For example, Nokia™ use Computer Interface Message Distribution protocol version Two (CIMD2).

In order for most internet-based IM systems to work, a unique identifier needs to be assigned to each user and an active account set up for the user on the IM server system under that identifier to enable the IM system to track and provide the requisite functionality of the IM facility to the user. Some IM systems allocate a Unique Identification Number "UIN") and others a code to the user to act as the unique identifier of that user within the IM system. The UIN or code may have a proxy name associated with it, to make it more recognisable or understandable to users of the system.

Even in those IM systems that permit connectivity with two or more different types of client application, either separate accounts under different identifiers are created for each different client type, or one client type is treated as the primary IM client and other client types are treated as terminal appliances to be merely notified of the sending of an IM to the corresponding primary IM client of the sender.

The reason for this is that the IM systems that were initially developed, such as ICQ™, were strongly oriented so that most of the intelligence in providing the functionality of the IM system resided in the PC client application program. Consequently, other client types were considered to be quite disparate to the main client application and if two-way connectivity was provided, ie the ability to send a reply in response to a received message, this required a separate account or server for each different client type.

This has led to a cumbersome approach in allocating unique identifiers for clients in an ad hoc or random manner with different unique identifiers and accounts being allocated by different IM server hosts for each different client type where the IM system has permitted such, particularly where the users adopted email-based client applications, or GSM devices. Furthermore, the registration process to be followed by new users wishing to join an IM system was unduly protracted and involved a multiple step process. This involved firstly requesting the IM system host to become a member, then awaiting the allocation of the unique identifier by the host for the member, and finally the member receiving and assigning that identifier to their specific client application. Another typical method involves firstly requesting the IM server host to become a member, the member applying for a certain unique identifier, and finally the host assigning that identifier to their that specific client application.

DISCLOSURE OF THE INVENTION

It is an object of the present invention to provide for allocating or assigning unique identifiers to prospective users of an instant messaging system, quickly and efficiently, including users adopting email-based client applications and GSM devices for accessing the IM system, to enable them to register an account on the system or to be conveniently invited to do so.

In accordance with one aspect of the present invention, there is provided a method for assigning a unique identifier to a prospective user of an instant messaging system comprising a plurality of clients having IM applications of the same or different types, selectively interconnected to an IM server by way of a computer network, the method comprising the following steps:

receiving a client specific access address of a prospective user on the computer network together with a request to register or tentatively register an account for said prospective user;

automatically allocating a unique identifier to the prospective user;

matching said unique identifier to the client specific access address of the prospective user;

registering or tentatively registering an account for said prospective user by storing the matched unique identifier and client specific access address with said IM server under the unique identifier; and sending notification of said unique identifier to said prospective user at the client specific address of the prospective user, either: confirming the registering of the prospective user if the initial sending was associated with a direct request to register from the prospective user; or inviting registration of the prospective user if the initial sending was associated with a request to register from someone other than the prospective user.

Preferably, the unique identifier is a UIN.

Preferably, said computer network is the internet and/or any direct electronic link.

Preferably, the prospective user has an email-based client application for accessing the IM system.

Preferably, the prospective user has a GSM device forming part of a GSM network for accessing the IM system.

Preferably, said client types connected to the computer network via the GSM network have SMS capability and are initially connected via an SMSC server to control and manage said SMS therebetween, and wherein said SMSC server is directly connected to said IM server via said computer network. In accordance with another aspect of the present invention, there is provided a system for assigning a unique identifier to a prospective user of an instant messaging system comprising a plurality of clients having IM applications of the same or different types, selectively interconnected to an IM server by way of a computer network, the system comprising:

a registration handling means for receiving a client specific access address of a prospective user on the computer network together with a request to register or tentatively register said prospective user;

a unique identifier assigning means to automatically allocate said unique identifier to said prospective user and match said unique identifier to the client specific address of the prospective user;

account processing means to register or tentatively register an account for said prospective user;

database means for storing the matched unique identifier and client specific access address under the unique identifier; and a message despatching means for sending notification of said unique identifier to said prospective user at the client specific address of the prospective user, either: confirming the registering of the prospective user if the initial sending was associated with a direct request to register from the prospective user; or inviting registration of the prospective user if the initial sending was associated with a request to register from someone other than the prospective user.

BRIEF DESCRIPTION OF THE DRAWINGS

The invention will be better understood in the light of the following description of one specific mode thereof. The description is made with reference to the accompanying drawings, wherein.

MODE FOR CARRYING OUT THE INVENTION

Figure 1:
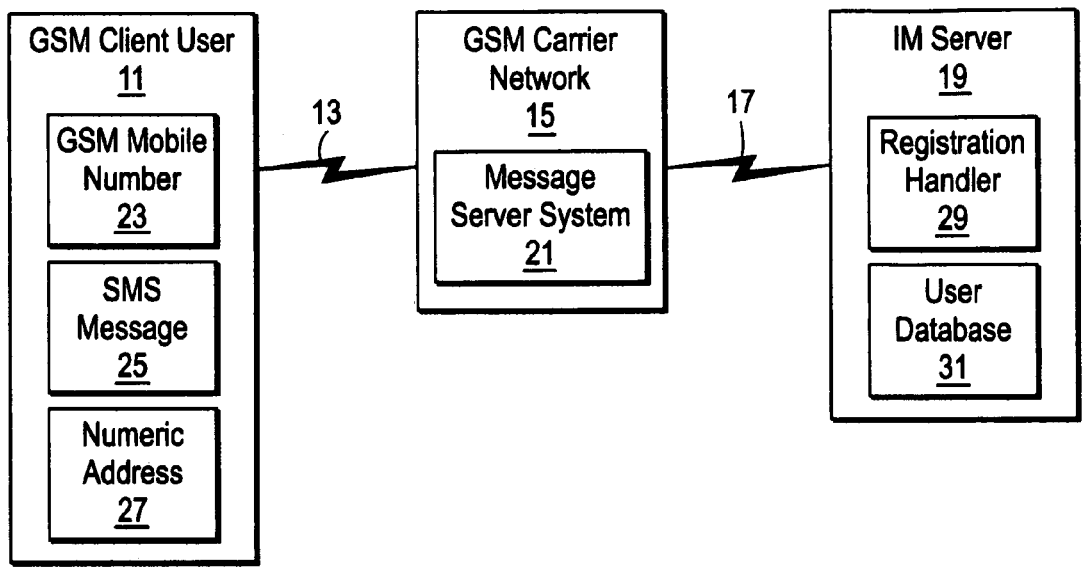
FIG. 1 is a schematic diagram showing generally how a GSM client can register with an IM system.

The particular mode for carrying out the preferred embodiment of the invention is directed towards a system and a method for assigning a unique identifier to register or tentatively register a prospective user on an instant messaging ("IM") system. The IM system includes a plurality of existing users or clients having IM applications of the same or different types, and which are selectively interconnected to an IM server of the system by way of a computer network such as the internet or other electronic link or links.

The types of clients that may be connected to such an IM system include: GSM mobile clients, PC-based clients, internet browser clients, and email clients. This is essentially made possible by the IM system having basic enabling functions residing within the IM server and by using a unique identifier in the form of a single Unique Identification Number ("UIN") for a user, regardless of the appliance or client type used by that user for accessing the IM server.

Registering an account for a prospective user to the IM system can be accomplished a number of ways depending on the client type of the user and how that user initially accesses the IM system. A feature of the present mode is to undertake the registration process quickly and efficiently with minimal inconvenience or action required on behalf of the prospective user.

Registration can be accomplished quite satisfactorily with prospective users running a PC-based IM client application or an internet browser client application. However such users have already undergone the inconvenience of accessing and downloading or browsing the particular client application, where the registration process can be tailored to suit the IM system provider quite easily, However, users using open client applications such as GSM mobile phones or email, cannot be handled in the same manner.

In order to achieve registration in accordance with the present mode, the IM server essentially comprises a registration handling means (registration handler), a unique identifier assigning means (UIN assigner), an account processing means (account processer), database means (user database) and a message despatching means (message despatcher). These are embodied in the form of program routines that are continuously executed under the control of an operating system in the IM server and thus automate the registration process.

The registration handler is invoked in response to the IM server receiving a client specific access address of a prospective user on the computer network, ie the internet, to which it may be connected to the server, together with a request to register or tentatively register the prospective user.

The difference between registration and tentative registration arises from whether the prospective user directly accesses the IM server in order to explicitly register an account (registration), or whether the prospective user is invited to register by an existing user, or the operator of the IM server itself (tentative registration). This will be explained in more detail later.

On being invoked, the registration handler essentially controls the remaining routines to effect the registration or tentative registration of the prospective user.

Firstly, it invokes the UIN assigner to automatically allocate a unique identifier in the form of a UIN to the prospective user and match this UIN to the client specific address of the prospective user, which was received by the registration handler.

Next it invokes the account processer to register or tentatively register an account on the user database for the prospective user. Initially, this entails storing the matched UIN and the client specific access address, under the UIN, so that the basic functionality of the IM system that is extended to users entered on the database of the IM server by accessing their accounts under their UIN, can similarly be extended to the prospective user on completion of the registration process.

The registration handler then invokes the message despatcher to send notification of the UIN to the prospective user at the user's client specific address. This will either be in conjunction with confirming the registering of the prospective user if the initial invocation of the registration handler was associated with a direct request to register the prospective user from the prospective user themselves, or inviting the prospective user to register if the initial invocation was associated with a request to register the prospective user by someone other than the prospective user.

In the case of a prospective GSM client user, the preferred embodiment of the present mode permits the prospective user to send a single SMS message to the IM server, which will automatically cause the server to open an account for that user by invoking the registration handler. FIG. 1 helps illustrate the basic process.

As shown, a GSM client 11 is connected via a wireless communication medium involving cellular telecommunication sites 13 to a GSM carrier network 15. The GSM carrier network 15 is in turn connected via a direct electronic link or the internet 17, to the IM server 19 of the IM system. It is important to have a direct electronic or internet link 17 between the GSM carrier network 15 and the IM server 19 in order to complete the IM system.

Within the GSM carrier network 15, or more precisely the SMSC or message server system 21 thereof, a numeric "access code" must be defined which essentially directs important information contained in an SMS message sourced by the GSM client 11 to the IM server 19.

The information contained in the SMS message that is of importance to the IM system includes the following:

the GSM mobile number 23 of the sender,
the text of the SMS message 25, and
the numeric address 27 of the recipient.

The GSM mobile number 23, in this case, is the client specific address of the prospective user and the numeric address 27 of the recipient is the address that allows the SMS to reach the IM server 19.

When the IM server 19 receives this essential data, the registration handler 29 uses the information to automatically register an account for the GSM client on the user database 31 of the server, In this instance, the GSM mobile phone number becomes the basis for generating the UIN. To be more precise, the GSM mobile phone number, excluding the "+" sign (as is customary for GSM numbers) is the UIN, as generated by the UIN assigner. Hence the UIN format is (Country Code)+(Area Code or GSM carrier access code)+(Mobile phone number).

The actual SMS message 25 may contain additional information that can be used by the IM server 19, for instance, a preferred "buddy" name. It may also contain a command that triggers a desired action by the IM server. This could be the case if, for example, the numeric address of the recipient (the IM server's address) by itself does not trigger the registration handler 29. Hence, the combination of the SMS body and recipient numeric address can be created or programmed to trigger or invoke the registration handler.

It is important to note that at this stage, the IM server 19 has actually identified the user by virtue of their actual GSM mobile phone number, and assigned a valid UIN to the user. Thus, for all intents and purposes of the IM system, the prospective user is now registered and hence is a member of the IM community.

The message despatcher is then invoked to send a short message back to the client specific address (ie the GSM telephone number) of the prospective user, via the SMSC server, notifying them of their UIN and confirming their registration and membership of the IM community.

In the preferred embodiment the UIN assigner also issues a password to accompany the UIN for security purposes. This password is provided together with the UIN by the message despatcher to the prospective user in the short message.

An actual example of the process undertaken is described below:
Step 1: Prospective GSM user Dennis receives an SMS invitation saying: "Hey be part of a revolution in messaging! Please reply to this with your preferred buddy name."
The original SMS message contains this essential information:
the numeric address of the IM server as defined within the GSM carrier network, eg Access Code XXX+ 001, and
Dennis's GSM mobile phone number, eg +639175336647.
Step 2: Dennis replies: "Cool D" and sends the SMS to XXX001. The GSM carrier's SMSC receives the SMS and notes its access code XXX, which means it has to redirect it to the IM server via a direct electronic link or the internet. The IM server eventually receives the message and undertakes the following processes:
it generates the UIN 639175336647,
assigns this to GSM user with mobile number +639175336647, and
gives Dennis a buddy name "Cool D".
Dennis is now a registered member of the IM community and can receive and send instant messages using his UIN 639175336647.

It should be noted that although the message despatcher sends the notification back to the prospective user as a short message via the SMSC server, it is actually designed to send the notification back through any access media permitted by the IM system and nominated by the prospective user, eg PC client application, email application, internet browser client application, as welt as GSM mobile phone.

In the case of registering an email client user, the preferred embodiment covers some more elaborate ways of registering a prospective user involving different ways of prompting the IM server. These include:
(i) a prospective email-based user sending an email message to the IM server system directly, indicating an interest in becoming a member of the IM community;
(ii) sending an electronic invitation by an existing IM user to the prospective e-mail-based user, inviting them to be a member of the IM community and/or an authorized buddy of that user; and
(iii) a prospective email-based user sending an email message to an existing user, suggesting their interest to communicate with that user and be a registered member of the IM community.

Figure 2:
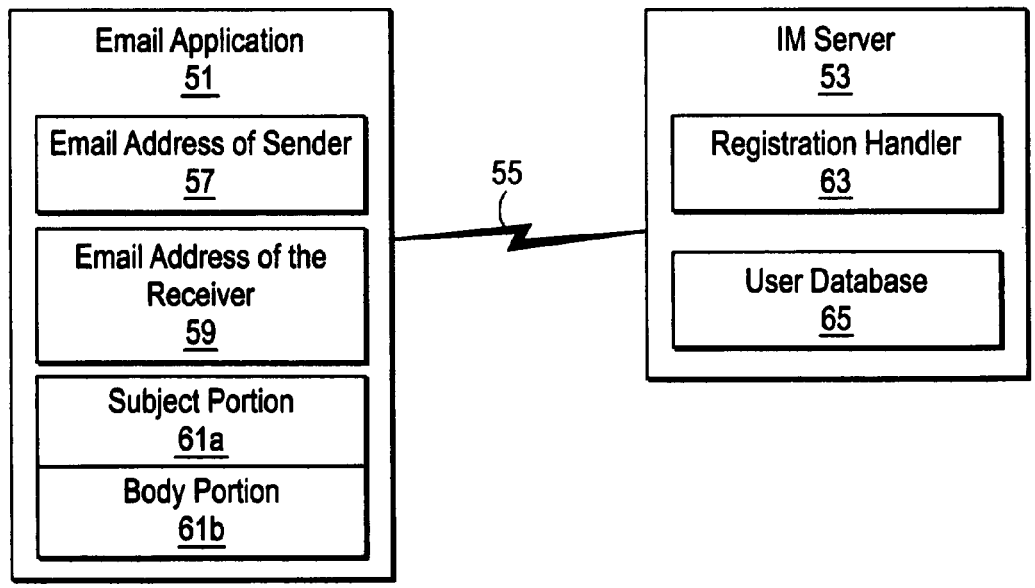
FIG. 2 is a schematic diagram showing generally how an email-based client can register with an IM system.

The first way of prompting the IM server in (i) is similar to the registration process described above with respect to a GSM client, ie the direct approach and is generally shown in FIG. 2.

Moreover, an email client user runs an email application 51 from their PC and may be connected to the IM server 53 via the internet 55, The email client user 51 registers an account with the IM server 53 by sending an email to the IM server via the internet 55.

The information contained in the email message that is of concern to the IM system includes the following:
the email address of the sender 57 (email client user),
the email address of the receiver 59 (IM server address), and
the subject 61*a* and/or body 61*b* part(s) of the message 61.

When the IM server 53 receives the email, the registration handler 63 uses this information to automatically register an account for the email client user on the user database 65 of server. In this instance, recognising that the prospective user is an email client user by virtue of receiving an email, the registration handler invokes the UIN assigner to generate a UIN from a range of available ones defined within the user database 65. This can be done randomly, although the preferred embodiment undertakes a systematic, ordered approach where the new UINs are issued sequentially. The generated UIN is matched to the client specific address of the prospective user, ie the email address of the user, and is stored in the user database by the account processer. This UIN then becomes the primary means of addressing instant messages intended for the prospective user.

The subject and/or body portion(s) 61*a* and 61*b* of the email can contain optional data that can be used by the IM server 53 in registering the new user, for instance a preferred "buddy" name.

At this stage the IM server 53 has identified the user by virtue of their actual email address, and assigned a valid UIN to them. Thus, for all intents and purposes of the IM system, the prospective user is now registered and hence is a member of the IM community.

The message despatcher is then invoked to send an email message back to the email address of the prospective user, notifying them of their UIN and confirming their registration and membership of the IM community.

In the preferred embodiment the UIN assigner also issues a password to accompany the UIN for security purposes. This password is provided together with the UIN by the message despatcher to the prospective user in the email.

An actual example of the process undertaken is described below:
Step 1: Prospective email user Dennis receives an invitation from the IM server system, The message reads: "Hey be part of a revolution in messaging! Please reply to this with your preferred buddy name on the Subject." Dennis' email is dennis@company.com. The IM server's "from" email address is NewUser@chikka.com.
Step 2: Dennis replies. He types in "Cool D" in the Subject portion and sends the email to NewUser@chikka.com. The IM server eventually receives the message. It generates UIN 12126556666 from a list of available UINs, assigns this to email user Dennis with email dennis@company.com, and finally gives Dennis a buddy name "Cool D".
Dennis is now a registered member of the IM community and can receive and send instant messages using his UIN 12125556666.

Figure 3:
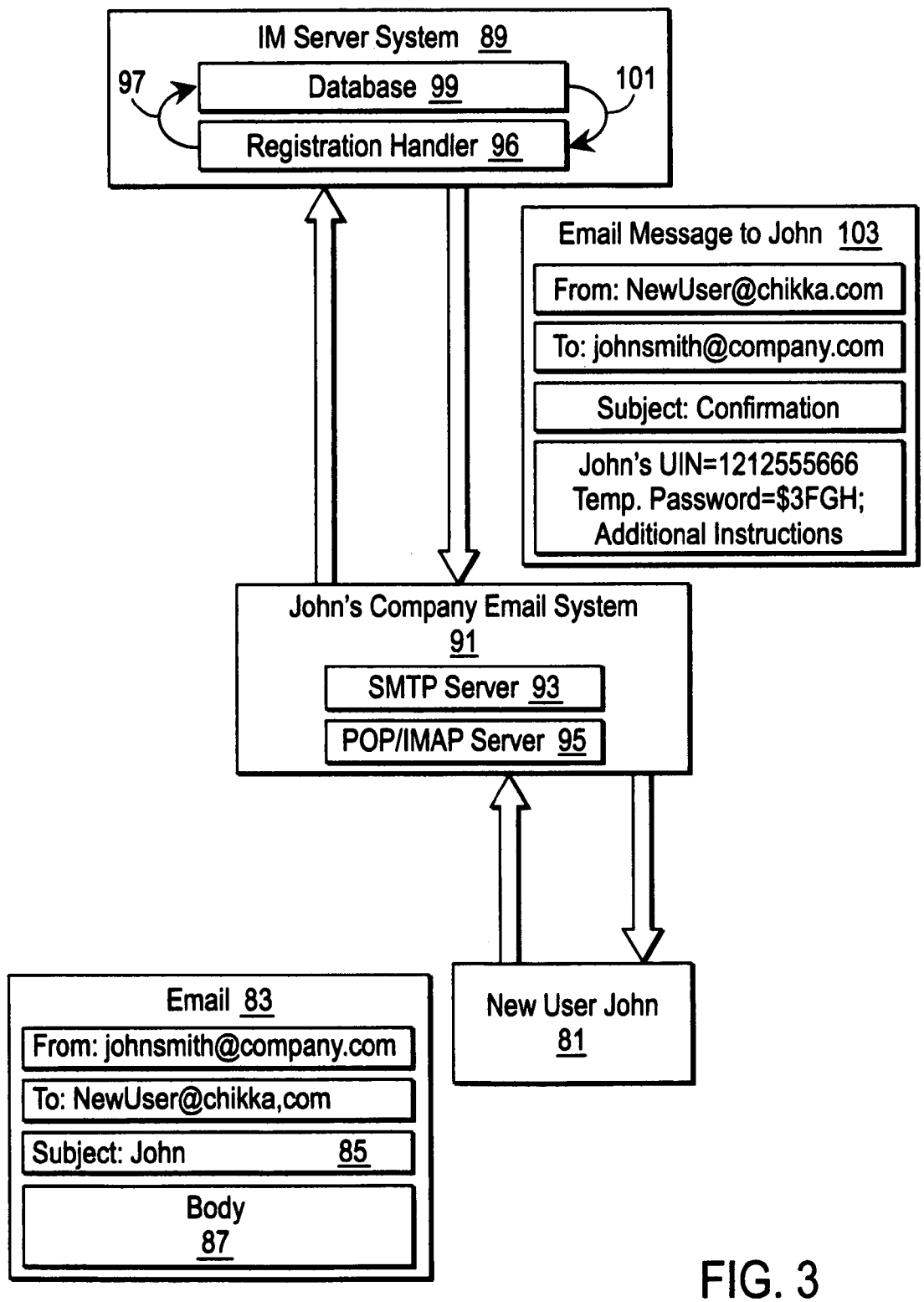
FIG. 3 is a block diagram showing how a prospective email-based client can register by direct contact with the IM server.

It should be noted that although the message despatcher sends the notification back to the prospective user as an email message, it is designed to send the notification back through any access media permitted by the IM system and nominated by the prospective user, eg PC client application, GSM mobile phone internet browser client application, as well as email application, This is illustrated further in another example, which will be described with reference to FIG. 3.

Step 1: Prospective new user prepares an email to the IM server system

Prospective new user John 81 prepares an e-mail message 83 for the IM server system using an appropriate email client application (eg Eudora™, Microsoft Outlook™). The IM server system's email address is NewUser@Chikka.com (for the purposes of this illustration). Other information can be contained in the email message subject 85 or body 87 that may be required or considered optional data by the IM server system in processing John's registration. John includes in the "Subject" portion 85 of the email his preferred "buddy name" John, for example.

Step 2: Email is sent to the IM server system and is processed for new membership The email 83 is received by the IM server system 89 via John's company email system 91. The company email system includes an SMTP server 93 and a POP/IMAP server 95. The registration handler 96 invokes the UIN assigner of the IM server system 89 generates a UIN to be assigned to John's email address johnsmith@company.com. The UIN 12125556666 is generated and stored 97 by the account processer in the user database 99. From here on, John is a registered member of the IM community. The email address johnsmith@company.com will always be associated with the UIN 12125556666 until such time John changes his email address assigned to that UIN.

Step 3: Confirmation messages sent to new user

The registration handler 96 invokes the message despatcher to send an email message 103 to John, confirming his membership status with the IM community. His UIN and temporary password are extracted 101 from the database 99 included in the message, along with additional instructions, as appropriate. (The email message may include instructions for setting up certain user-defined preferences for John's IM account.)

Step 4: Account now set up for receiving instant messages

From here on, all instant messages sent to UIN 12125556666 will automatically be directed to johnsmith@company.com, as the messages would also be forwarded to John's other IM client, eg PC client application.

The second way of prompting the IM server as referred to in (ii) above, namely an electronic invitation by an existing IM user to be a member and/or be an authorized buddy is sent to the prospective e-mail-based user, is more indirect than the first way and involves initially creating a tentative registration.

Thus existing members of the IM community can send an invitation to a prospective member to join the community by triggering the IM system server. The invitation is in electronic form and may come from any type of client insofar as the present mode is concerned, eg an SMS message from a GSM device, an internet signal from a PC-based or internet browser-based client application, or a regular e-mail message.

For example, a PC-based client user may send an electronic Invitation to a prospective email-based client who is not yet a member of the IM community, which is captured by the IM system.

Once triggered, the IM system server sends an invitation to a target new user in the form of an e-mail message. Before sending the e-mail invitation, the IM system server invokes the registration handler to tentatively register the prospective user. In so doing, as previously described, the registration handler invokes the UIN assigner to assign a new UIN to the target user's e-mail address.

The UIN will then be the primary means of addressing instant messages intended for that new user. To send a message to the new user, all that the sender has to do is to specify the UIN of the intended party in the recipient's address field. The instant message will be sent accordingly, assuming the new user has permitted such. Users have the option of specifying how messages can be received, whether a message is sent to any combination of the following access media: PC Client, GSM mobile phone, and email-based client.

It should be noted that a peculiar situation arises when an electronic invitation is sent to a prospective email-based client by a GSM client. Moreover, using a UIN as the primary means of addressing messages is essential to the efficient exchange of messages between these two client types. As previously described, GSM clients primarily send instant messages by directing them to numeric addresses or GSM mobile phone numbers, not alphanumeric names. In the light of this, it is necessary for GSM clients to embed the email address of the target recipient in the message containing the invitation and route it via the IM server for delivery to the email client. In order to do this, the message is sent to a universal access number, as defined by the carrier, for the processing of email-targeted messages.

The target new user must then respond to the email message accordingly to complete the account registration process. In this step, the target new user must reply via an electronic confirmation, which could be a simple email, confirming his acceptance to be part of the IM community. The "reply-to" address of the email is that of the IM server system, which once received, processes the email acceptance accordingly. The email message is processed to see if the target user has indeed agreed to be a member of the IM community.

Figure 4:
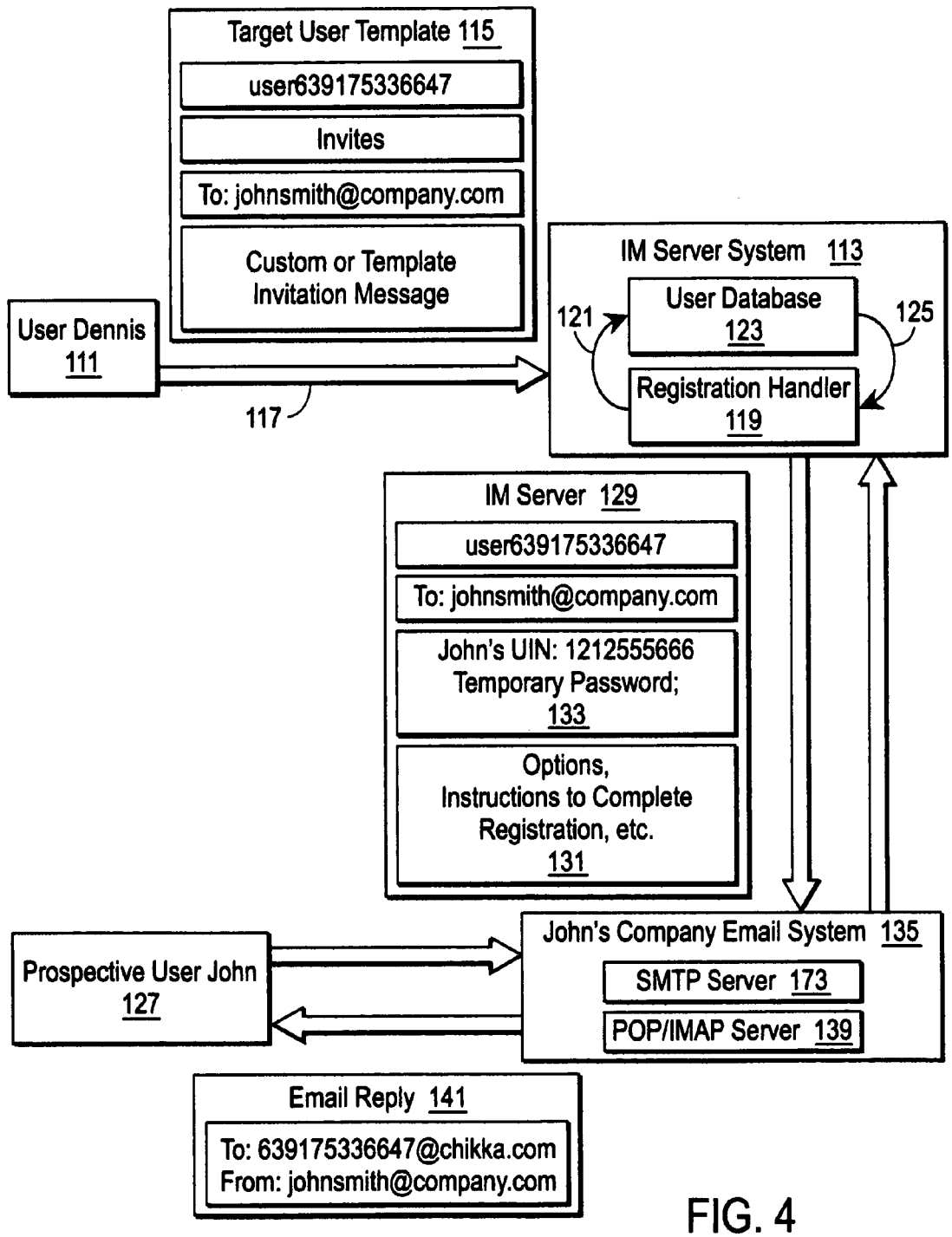
FIG. 4 is a block diagram showing how a prospective email-based client can be tentatively registered by direct contact from an existing member of the IM system.

The arrangement is more clearly illustrated by the following example which is described with reference to FIG. 4:

Step 1: Existing user prepares an invitation to a prospective email-based user from a PC based client application.

Existing user Dennis 111, with UIN 639175336647, triggers the IM server system 113 by clicking the "button" "Invite a Friend" on a PC-based client application of an IM system. Dennis selects the option "invite by email" and specifies the email address of the target new user. A template 115 for inviting the target user, containing a default message or a personal message written by Dennis, is prepared by the IM server system for Dennis to complete and to be sent by the IM server to John Smith, For this illustration, the email address johnsmith@company.com is specified. The message for the template 115 is then completed with the necessary information and sent to the IM server 113 via the internet 117.

Step 2; IM server system assigns a UIN to the target new user and email address of target new user The registration handier 119 of the IM server system 113 causes the UIN assigner to generate a UIN to be assigned and matched to John Smith's email address in the manner previously described. For this illustration, UIN 12125556666 is matched to johnsmith@company.com and is assigned to John Smith as his unique ID for the purpose of handling messages by the IM server system. This mapping will be stored 121 in the user database 123 for future use 125.

Step 3: Message is sent to the target new user.

The IM server sends an email 129 to the prospective user John Smith 127 at johnsmith@company.com. The message is an invitation by Dennis for John to be a member of the IM community and an authorized "buddy" of Dennis. Detailed and additional instructions on how to complete the registration process are contained in the body 131 of the message. The subject 133 of the email contains such information John's UIN (e.g., 12125556666) and temporary password. The message 129 also gives the option for John to download the PC-based application with which John Smith can also use to complete the optional registration procedure. For the purposes of this illustration, the "From" email address is 639175336647@Chikka.com. The user ID portion of this email address is the UIN of Dennis. (The "From" address can also be some other address that is directed to the IM server system, which if sent there, the IM system server would be able to process accordingly for the purpose of completing John Smith's registration.) In the present example, the email 129 is routed via John's company's email system 135 which includes a SMTP server 137 and a POP/IMAP server 139.

Step 4: Target new user responds to the email

John Smith agrees to join the IM community by simply replying 141 to the email message. This action immediately prompts the IM server system 113 that John Smith has agreed to join the IM community and that he has authorized Dennis to be included in his "buddy" list; hence, John Smith can receive instant messages from Dennis and Dennis can be notified of John's "online" status.

From here on, John Smith will have the UIN 12125556666 within the IM community. All instant messages sent to this UIN will be automatically directed to johnsmith@company.com.

Message exchange with GSM clients will in particular be as easy as the GSM client user sending an SMS message to a numeric address consisting of the GSM carrier "access code" plus the UIN.

The third way of prompting the IM server as referred to in (iii) above, namely a prospective email-based user sends an email message to an existing user, suggesting his interest to communicate with the existing user and be a registered member of the IM community, is direct in the sense of the prospective user prompting the registration and indirect in the sense of being routed via the existing user to the IM server. Nonetheless, by virtue of the preferred embodiment, the registration process is relatively easy.

As previously mentioned, each member of the IM community is assigned a UIN. This UIN (eg "1234567"), if appended to a defined URL (eg @chikka.com to create the email address 1234567@chikka.com), acts as the email address by which email messages sent to this address are directed to the IM account of the user with that UIN.

Once an email message addressed to a member is received, the IM server system immediately assigns an internally generated UIN to the sender's email address, as previously described. This UIN will then become the primary means of addressing Instant messages intended for the new user.

From then on, all instant messages sent to this UIN will automatically be directed to that user's email address, and would also be forwarded to the other IM client applications of that user, eg PC client application. The original email message intended for the existing IM user, addressed to 12345670@chikka.com, will be further processed by the IM system server.

In certain cases, part or the entire email message will eventually be sent as an instant message to the existing user. In other cases, where authorizations are required, the email message or parts of it will not be immediately sent to the user with UIN 1234567. Only when the new user is authorized by user 1234567, would the original email message be sent.

Figure 5:
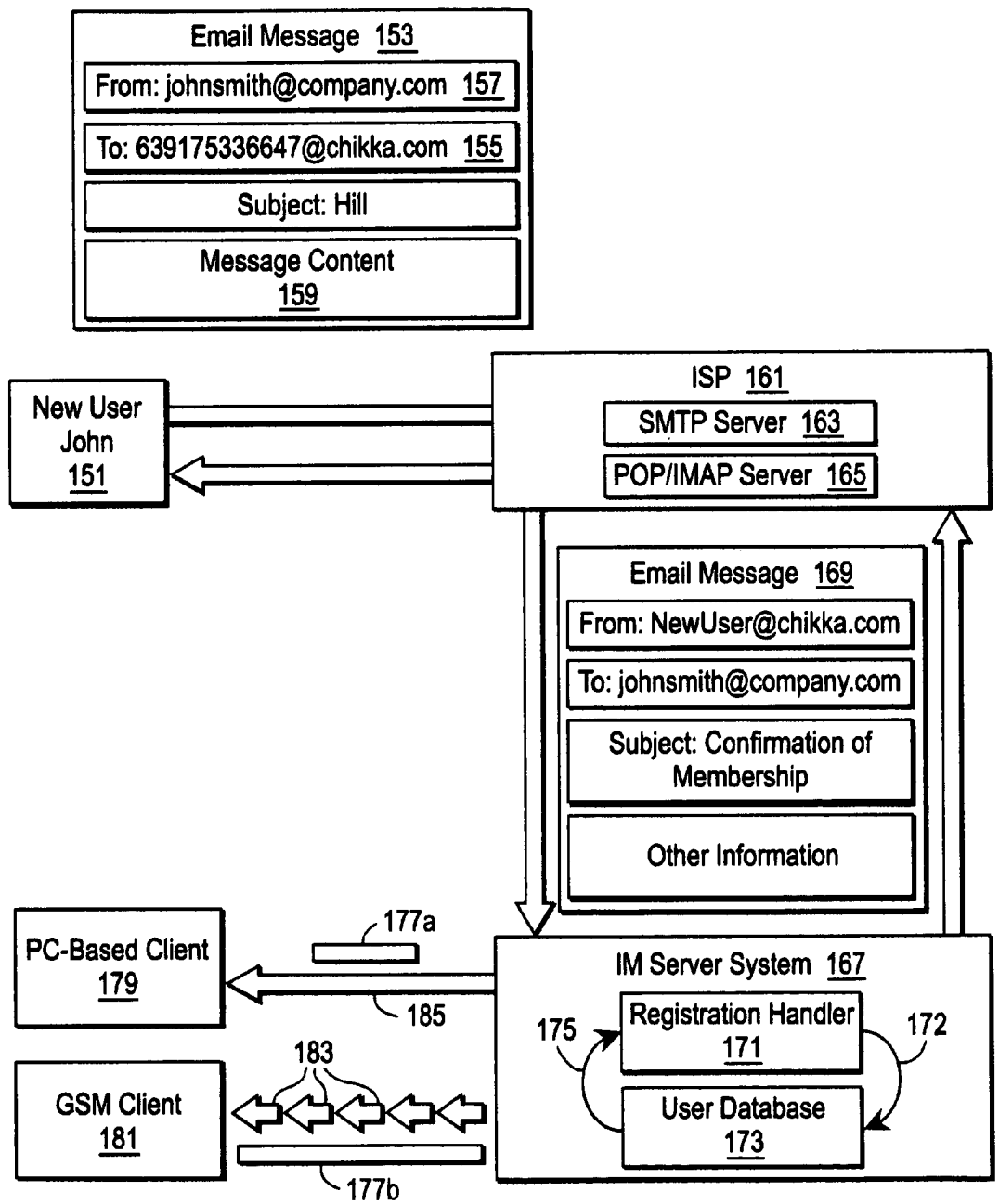
FIG. 5 is a block diagram showing how a prospective email-based client can be registered following direct contact made to an existing member of the IM system.

This arrangement will be described by way of the following example with reference to FIG. 5.

Step 1: Prospective new user prepares an email intended for an existing IM user

Prospective new user John 151 prepares an email message 153 addressed to an existing IM user Dennis with UIN 639175336647. The "Send to" portion 155 of the email is to 639175336647@chikka.com. John's email address in the "From" portion 157 of the email is johnsmith@company.com. The body 159 of the message may contain additional information, which the IM server system may use or which may be sent to the existing IM user, eg message.

Step 2: Email is sent and sender is processed for new membership

The IM server 167 receives John's email 153 for Dennis via the ISP 161 for John, containing a SMTP server 163 and a POP/IMAP server 165. The registration handler 171 of the IM server system 167 causes the UIN assigner to generate UIN 12125556666 to be matched to John's email address johnsmith@company.com and the account processer stores 172 this data in the user database 173 for future use 175. From here on, John is a registered member of the IM community, with UIN 12125556666. The email address johnsmith@company.com will always be associated with the UIN 12125556666 until such time John specifically changes his email address for UIN 12125556666. An email message 169 confirming John's membership is sent by the message despatcher of the IM server system 167 to johnsmith@company.com.

Message exchange with GSM clients will be particularly easy since the GSM client user sends a message to a numeric address consisting of the GSM carrier "access code" plus the UIN.

The original email message 153 by John is processed according lo the two types of authorization status as follows:

(i) In the event of there being no authorizations required to be part of the buddy list of existing users, the email message by John will be sent in part or entirely to Dennis in the form of an instant message 177. Dennis can receive the message 177a and 177b by accessing his IM account, through any allowed access media: PC-based client 179, GSM client 181, and email client. In the case of the GSM client, the information transmitted is broken up into several parts or packets 183, whereas it may be transmitted as a single part 185 with the PC-based client.

In the case where authorizations are required to be part of someone's buddy list of existing users, a template instant message is sent to Dennis informing him that John wishes to be authorized as a buddy. This message could be similar to this: "Hi Dennis (or buddy name not displayed if not available)! John (or buddy name not displayed if not available) with email johnsmith@company.com wants you to be his buddy. To accept, please reply to this message with 'Accept'." If Dennis accepts, Dennis is immediately included in John's buddy list. From here on, John can send instant messages to Dennis.

It should be noted that in each of the aforementioned ways of prompting the IM server system, the IM server automatically assigns a UIN to the prospective user's email address, requiring little or no human or user intervention to process and create the account for that user on the IM server. With the UIN being the primary means of addressing messages through the IM server, it facilitates the efficient and user-transparent exchange of messages between an email client and GSM client in particular, which has hereinbefore not been possible.

Thus the present mode takes advantage of the IM server acting as an intermediary to accommodate the fact that GSM clients primarily send an SMS instant message to a numeric address or GSM mobile phone number, while email-based users send their messages by email. Communication of the instant messages is controlled by the IM server and then achieved using normal message transmission mechanisms from either media.

It should be appreciated that the scope of the present invention is not limited to the specific mode and the embodiment thereof described herein. Accordingly, changes and improvements to the embodiment that amount to no more than common general knowledge are not considered to depart from the spirit or scope of the invention.

The claims defining the invention are as follows:

1. A method for registering or inviting registration of a prospective user of an instant messaging system comprising a plurality of clients having IM applications of the same or different types, selectively interconnected to an IM server by way of a computer network, the method comprising the following steps:
   receiving a client specific access address of a prospective user on the computer network together with a request to register or tentatively register an account for said prospective user;
   automatically generating and allocating a unique identifier to the prospective user;
   matching said unique identifier to the client specific access address of the prospective user;
   wherein if the initial receiving was a direct request to register from the prospective user, registering an account for said prospective user by storing the matched unique identifier and client specific access address with said IM server under the unique identifier;
   determining whether the initial receiving was associated with a request to register the prospective user from someone other than the prospective user and in response to said determining step, tentatively registering an account for said prospective user by storing the matched unique identifier and client specific access address with said IM server under the unique identifier; and
   sending notification of said unique identifier to said prospective user at the client specific address of the prospective user, wherein said notification confirms the registering of the prospective user if the initial receiving was associated with a direct request to register from the prospective user; and in response to said determining step, said notification invites registration of the prospective user.

2. A method as claimed in claim 1, wherein the unique identifier is a UIN.

3. A method as claimed in claim 1, wherein said computer network is the internet and/or any direct electronic link.

4. A method as claimed in claim 1, wherein the prospective user has an email-based client application for accessing the IM system.

5. A method as in claimed in claim 1, wherein the prospective user has a GSM device forming part of a GSM network for accessing the IM system.

6. A method as claimed in claim 5, wherein said GSM network has SMS capability and said prospective user is initially connected to an SMSC server to control and manage said SMS therebetween, and wherein said SMSC server is directly connected to said IM server via said computer network.

7. A method as claimed in claim 1, wherein said client specific address is sourced from an email or SMS message sent to the email address of said IM server.

8. A method as claimed in claim 7, wherein said email or SMS message is sent by said prospective user.

9. A system as claimed in claim 7, wherein the unique identifier is a UIN.

10. A system as claimed in claim 7, wherein said computer network is the internet and/or any direct electronic link.

11. A system as claimed in claim 7, wherein the prospective user has an email-based client application for accessing the IM system.

12. A system as claimed in claim 7, wherein the prospective user has a GSM device forming part of a GSM network for accessing the IM system.

13. A system as claimed in claim 7, wherein said GSM network has SMS capability and said prospective user is initially connected to an SMSC server to control and manage said SMS therebetween, and wherein said SMSC server is directly connected to said IM server via said computer network.

14. A system as claimed in claim 7, wherein said client specific address is sourced from an email or SMS message sent to the email address of a registered user on said IM server.

15. A method as claimed in claim 1, wherein said client specific address is sourced from an email or SMS message sent to the email address of a registered user on said IM server.

16. A method as claimed in claim 1, wherein said client specific address is sourced from a message sent to said IM server from a registered user of said IM system, on any client type accessible to said IM server.

17. A system as claimed in claim 1, wherein said client specific address is sourced from an email or SMS message sent to the email address of said IM server.

18. A system as claimed in claim 17, wherein said email or SMS message is sent by said prospective user.

19. A system as claimed in claim 17, wherein said client specific address is sourced from a message sent to said IM server from a registered user of said IM system, on any client type accessible to said IM server.

20. A system for registering or inviting registration of a prospective user of an instant messaging system comprising a plurality of clients having IM applications of the same or different types, selectively interconnected to an IM server by way of a computer network, the system comprising:
- a registration handling means for receiving a client specific access address of a prospective user on the computer network together with a request to register or tentatively register said prospective user;
- a unique identifier assigning means to automatically allocate a unique identifier to said prospective user and match said unique identifier to the client specific address of the prospective user;
- account processing means configured to register an account for said prospective user if the initial receiving was associated with a direct request to register from the prospective user, and configured to determine when the initial receiving was associated with a request to register the prospective user from someone other than the prospective user, and based on the determination, tentatively register an account for said prospective user;
- database means for storing the matched unique identifier and client specific access address under the unique identifier; and
- a message despatching means for sending notification of said unique identifier to said prospective user at the client specific address of the prospective user,
- wherein the notification confirms the registering of the prospective user if the initial receiving was associated with a direct request to register from the prospective user, and
- based on the determination by the account processing means, wherein the notification invites registration of the prospective user.

* * * * *